US005565219A

United States Patent [19]
Hatanaka et al.

[11] Patent Number: 5,565,219
[45] Date of Patent: Oct. 15, 1996

[54] BANK QUANTITY ADJUSTING DEVICE FOR EXTRUDER

[75] Inventors: Takeshi Hatanaka; Toshiyuki Miyamoto; Toshio Ujihara, all of Takasago, Japan

[73] Assignee: Kabushiki Kaisha Kobe Seiko Sho, Kobe, Japan

[21] Appl. No.: 305,349

[22] Filed: Sep. 13, 1994

[30]  Foreign Application Priority Data

Sep. 14, 1993 [JP] Japan ..................................... 5-229079
Dec. 7, 1993 [JP] Japan ..................................... 5-306611

[51] Int. Cl.$^6$ ........................... B29C 47/32; B29C 47/92
[52] U.S. Cl. .......................................... 425/145; 425/149
[58] Field of Search ..................................... 425/145, 147, 425/149, 150

[56] References Cited

U.S. PATENT DOCUMENTS

| | | | |
|---|---|---|---|
| 4,304,539 | 12/1981 | Hagiwara et al. | 425/145 |
| 4,810,179 | 3/1989 | Cavanagh | 425/149 |
| 4,858,139 | 8/1989 | Wirtz | 425/145 |
| 5,030,079 | 7/1991 | Benzing, III | 425/145 |
| 5,094,790 | 3/1992 | Halter | 425/149 |

FOREIGN PATENT DOCUMENTS

| | | |
|---|---|---|
| 0429161 | 5/1991 | European Pat. Off. . |
| 0560142 | 9/1993 | European Pat. Off. . |
| 4034144 | 5/1991 | Germany . |
| 55-4575 | 1/1980 | Japan . |
| 56-118841 | 9/1981 | Japan . |
| 3-16223 | 2/1991 | Japan . |
| 4-10918 | 1/1992 | Japan . |
| 4-10917 | 1/1992 | Japan . |
| 5-104607 | 4/1993 | Japan . |

OTHER PUBLICATIONS

Patent Abstracts of Japan, vol. 17, No. 455, (M-1466), Aug. 20, 1993, JP-A-5104607, Apr. 27, 1993.
Patent Abstracts of Japan, vol. 13, No. 369, (M-860), Aug. 16, 1989, JP-A-1123720, May 16, 1989.
Patent Abstracts of Japan, vol. 12, No. 105, (M-681), Apr. 6, 1988, JP-A-62236716, Oct. 16, 1987.
Patent Abstracts of Japan, vol. 11, No. 215, (M-606), Jul. 11, 1987, JP-A-62033615, Feb 13, 1987.

*Primary Examiner*—James P. Mackey
*Attorney, Agent, or Firm*—Oblon, Spivak, McClelland, Maier & Neustadt, P.C.

[57]  ABSTRACT

A bank quantity adjusting device for an extruder capable of accurately controlling a bank quantity regardless of a difference in composition of a material to be extruded. The bank quantity adjusting device includes a pressure sensor 13 for detecting a bank pressure between an outlet 7 of an extruder body 1 provided with material extruding screws 3 and a roller die 2 provided before the outlet 7, and a control device 15 for controlling one or both of a screw speed and a roller die speed according to a difference between the bank pressure detected by the pressure sensor 13 and a set target pressure. The bank quantity adjusting device further includes bank quantity detector 14 for detecting a bank quantity between the outlet 7 and the roller die 2, and a processor 16 provided in the control device 15 for obtaining a correlation between the bank quantity and the bank pressure from a detection value of the bank quantity detected by the bank quantity detector 14 and a detection value of the bank pressure detected by the pressure sensor 13 upon detection of the bank quantity, converting a target value of the bank quantity into a pressure value by using the correlation obtained above, and setting this pressure value to the above target pressure.

11 Claims, 11 Drawing Sheets

BANK QUANTITY ADJUSTING DEVICE FOR EXTRUDER

BACKGROUND OF THE INVENTION

1. Field of the Invention

The present invention relates to a bank quantity adjusting device for an extruder for extruding a polymeric material such as rubber to form a sheet.

2. Description of the Prior Art

This kind of extruder is provided with a roller die consisting of a pair of upper and lower rollers on the downstream side of an outlet of an extruder body. A material supplied from a batch type mixer into the extruder body is extruded by a screw provided in the extruder body, and is then allowed to pass between the pair of upper and lower rollers of the roller die, thus forming a sheet from the extruded material. In such an extruder, a bank quantity of the material accumulated in a bank portion defined between the outlet of the extruder body and the roller die must be properly controlled to uniform the shape (width, thickness, etc.) of the sheet to be discharged.

A control method for the bank quantity is described in Japanese Patent Publication No. 55-4575, for example. According to this method, the bank quantity is controlled by detecting a bank pressure and then controlling a screw speed or a roller die speed on the basis of the bank pressure detected. In this conventional method including detection of the bank pressure, however, the bank quantity is not proportional to the bank pressure because of a variation in hardness of rubber due to a difference in composition of the material. Accordingly, accurate control is difficult to perform.

Another control method for the bank quantity is described in Japanese Patent Laid-open No. 56-118841, for example. According to this method, the bank quantity is controlled by detecting a bank quantity and then controlling a screw speed or a roller die speed on the basis of the bank quantity detected. In this conventional method including detection of the bank quantity, however, there is a problem that a movable portion for detecting the bank quantity is clogged with rubber. Examples of such a bank quantity detecting device for detecting the bank quantity are described in Japanese Patent Laid-open Nos. 4-10918 and 5-104607. The former discloses a contact type of bank quantity detecting device, while the latter discloses a noncontact type of bank quantity detecting device.

SUMMARY OF THE INVENTION

It is accordingly an object of the present invention to provide a bank quantity adjusting device for an extruder which can accurately control a bank quantity regardless of a difference in composition of a material to be extruded.

According to the present invention, there is provided a bank quantity adjusting device for an extruder, comprising a plurality of screws for extruding a material, a roller die having a pair of upper and lower rollers for sheeting the material extruded by the screws, bank pressure detecting means for detecting a bank pressure, bank quantity detecting means for detecting a bank quantity, converting means for converting a target value of the bank quantity into a pressure value by using the bank quantity detected by the bank quantity detecting means and the bank pressure detected by the bank pressure detecting means, and control means for controlling one or both of a rotational speed of the screws and a rotational speed of the rollers of the roller die according to the pressure value obtained by the converting means. In one form of the present invention, the bank quantity detecting means detects a single level of the material as the bank quantity. In another form of the present invention, the bank quantity detecting means detects a plurality of levels of the material as the bank quantity. In still another form of the present invention, the bank quantity adjusting device further comprises storing means for preliminary storing a correlation between the bank quantity and the bank pressure, wherein the converting means corrects the correlation stored in the storing means and the control means controls the bank quantity by using the correlation corrected by the converting means.

With this constitution, even when the hardness of the material to be extruded changes to cause a change in the bank pressure, the bank quantity can be accurately controlled to a predetermined target value without being influenced by the change in the hardness of the material, because the bank quantity is controlled according to the correlation between the bank quantity and the bank pressure.

BRIEF DESCRIPTION OF THE DRAWINGS

FIGS. 2a–b is a view illustrating a condition where a bank quantity increases to turn on bank quantity detecting means;

FIGS. 3a–b is a view illustrating a condition where the bank quantity decreases after the condition of FIGS. 2a–b to turn off the bank quantity detecting means;

FIGS. 6a–c is a time chart showing the relation between screw revolutions, bank quantity, and roller revolutions;

DETAILED DESCRIPTION OF THE PREFERRED EMBODIMENTS

According to a preferred embodiment of the present invention, a predetermined value of the bank quantity is detected by the bank quantity detecting means, and the bank pressure at the time of detection of the above predetermined value of the bank quantity is detected by the pressure sensor. The correlation between the bank quantity and the bank pressure is obtained from the detected bank quantity and the detected bank pressure. An optimum bank quantity (target quantity) for formation of a sheet material having a predetermined shape is a known value. Then, the target quantity is converted into a pressure value by using the correlation obtained above, and this pressure value is set as a target pressure. According to the difference between a pressure detected by the pressure sensor and the target pressure, one or both of the rotational speed of the screws and the rotational speed of the rollers is/are controlled to thereby maintain the bank quantity at the target value.

A change in hardness of the material to be extruded due to a difference in composition or the like of the material causes a change in the correlation between the bank quantity and the bank pressure. Therefore, the target pressure set above must be changed in accordance with the change in the hardness of the material.

According to the present invention, the correlation is first obtained from the detected bank quantity and the detected bank pressure, and then the target pressure is set according to the correlation obtained above. Accordingly, the target value of the bank quantity can be accurately maintained regardless of the change in the hardness of the material.

When the bank quantity detecting means comprises a sensor for detecting a single level of the material as the bank quantity, the relation between the detected bank quantity and the detected bank pressure is represented as a single point. Accordingly, the correlation between the bank quantity and the bank pressure is obtained as a proportional constant.

When the bank quantity detecting means comprises a plurality of sensors for detecting a plurality of levels of the material as the bank quantity, the relation between the detected bank quantities and the detected bank pressures is represented as a plurality of points plotted. Accordingly, the correlation between the bank quantity and the bank pressure is obtained as a broken line or a curved line.

According to another preferred embodiment of the present invention, the correlation between the bank quantity and the bank pressure of a material having given characteristics is preliminary obtained and stored in the storing means. In actual operation, a predetermined value of the bank quantity is detected by the bank quantity detecting means, and the bank pressure at this time is detected by the pressure sensor. Then, the relation between the detected bank quantity and the detected bank pressure is obtained. Further, the correlation stored in the storing means is corrected so that the relation obtained above satisfies the correlation, and the target value of the bank quantity is converted into a pressure value by using the correlation corrected above. Then, this pressure value is set as the target pressure.

Finally, according to the difference between a pressure detected by the pressure sensor and the target pressure set above, one or both of the rotational speed of the screws and the rotational speed of the rollers is/are controlled to thereby maintain the bank quantity at the target value.

A preferred embodiment of the present invention will now be described in more detail with reference to the drawings.

Figure 1:
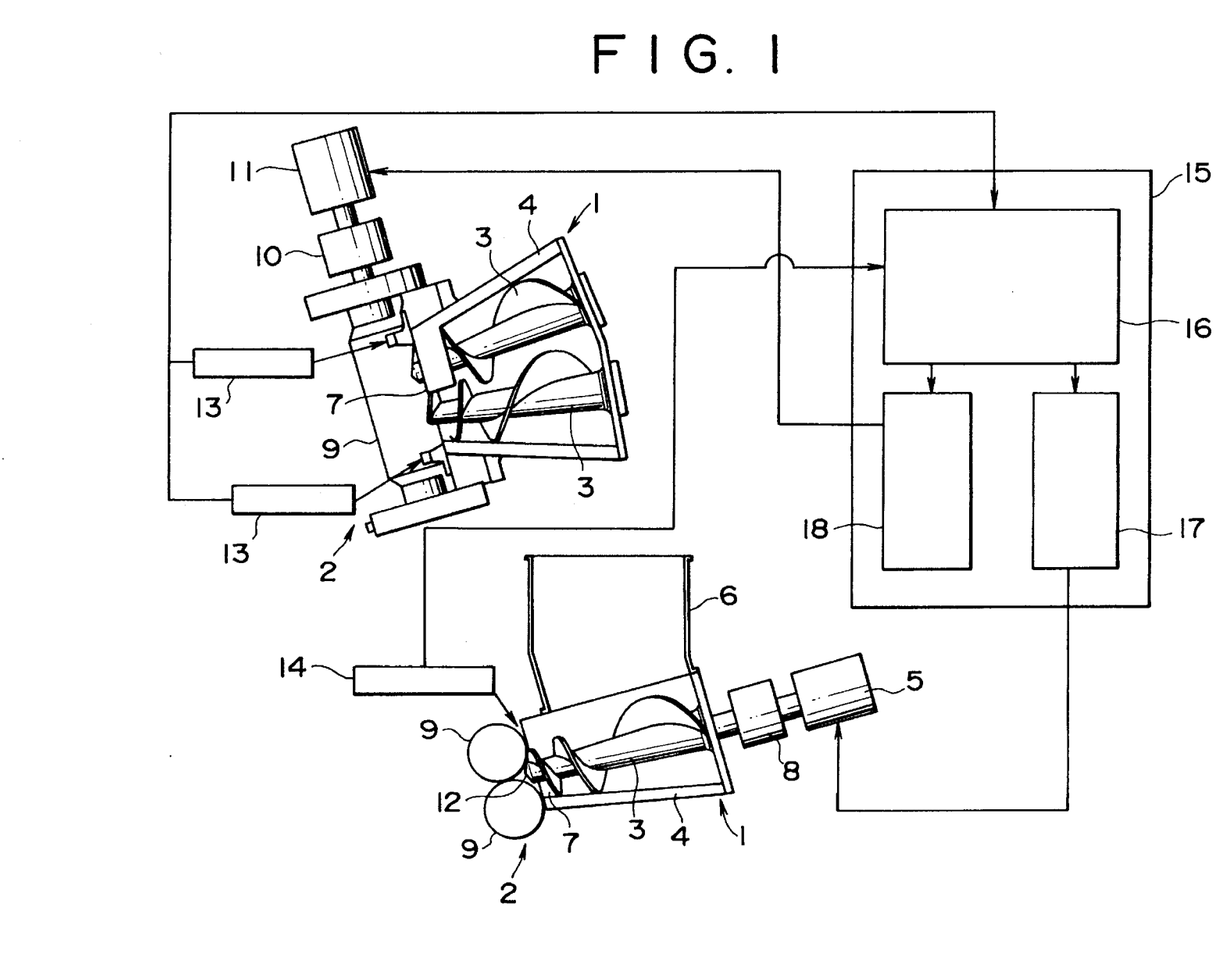
FIG. 1 is a block diagram of a bank quantity adjusting device for an extruder according to a preferred embodiment of the present invention.

Referring to FIG. 1, there is shown an extruder including an extruder body 1 and a roller die 2. The extruder body 1 includes a pair of right and left extruding screws 3, a chamber 4 in which the screws 3 are rotatably supported, and a motor 5 for rotationally driving the screws 3. The chamber 4 includes a hopper 6 for charging a material to the upper surface and an outlet 7 for discharging the material from the front end. The pair of screws 3 are cooperatively connected together through a gear reducer 8 at the rear ends, and are exposed at the front ends to the outlet 7 of the chamber 6. The roller die 2 includes a pair of upper and lower rollers 9 located before the outlet 7 of the chamber 4. The pair of rollers 9 are cooperatively connected together through a gear reducer 10 so as to be rotated in reverse directions, and are rotationally driven by a calender roll drive motor 11.

A bank portion 12 for accumulating a material to be extruded is defined between the outlet 7 of the chamber 4 and the rollers 9. The bank portion 12 is provided with a pair of pressure sensors 13 for detecting a bank pressure (pressure of the material accumulated in the bank portion 12) and bank quantity detecting means 14 for detecting a bank quantity (quantity of the material accumulated in the bank portion 12).

Each pressure sensor 13 is constructed of a load cell, a resin pressure gage, etc. The pair of pressure sensors 13 are located in the bank portion 12 at right and left positions thereof between the two rollers 9.

As also shown in FIGS. 2a–b and 3a–b, the bank quantity detecting means 14 is constructed as a level sensor employing a phototube or the like, and is located at such a position as to sense when the level of the material accumulated in the bank portion 12 reaches a predetermined level. In this preferred embodiment, the bank quantity detecting means 14 is designed to detect a single level.

As shown in FIG. 1, the screw drive motor 5, the calender roll drive motor 11, the pressure sensors 13, and the bank quantity detecting means 14 are connected to a control device 15.

The control device 15 includes processing means 16 connected to the pressure sensors 13 and the bank quantity detecting means 14, a screw drive motor control panel 17 and a calender drive motor control panel 18 both adapted to be operated by commands from the processing means 16.

The processing means 16 functions to feed back the difference between a pressure detected by the pressure sensors 13 and a set target pressure to the screw drive motor control panel 17 or the calender drive motor control panel 18, control a screw speed or a roller die speed, and maintain a bank quantity of the material accumulated in the bank portion 12 at a target quantity.

In particular, when the bank quantity detecting means 14 detects a predetermined bank quantity and the pressure sensors 13 detect a bank pressure at this time, the processing means 16 obtains the correlation between a bank quantity and a bank pressure from the detected bank quantity and the detected bank pressure.

Figure 4:
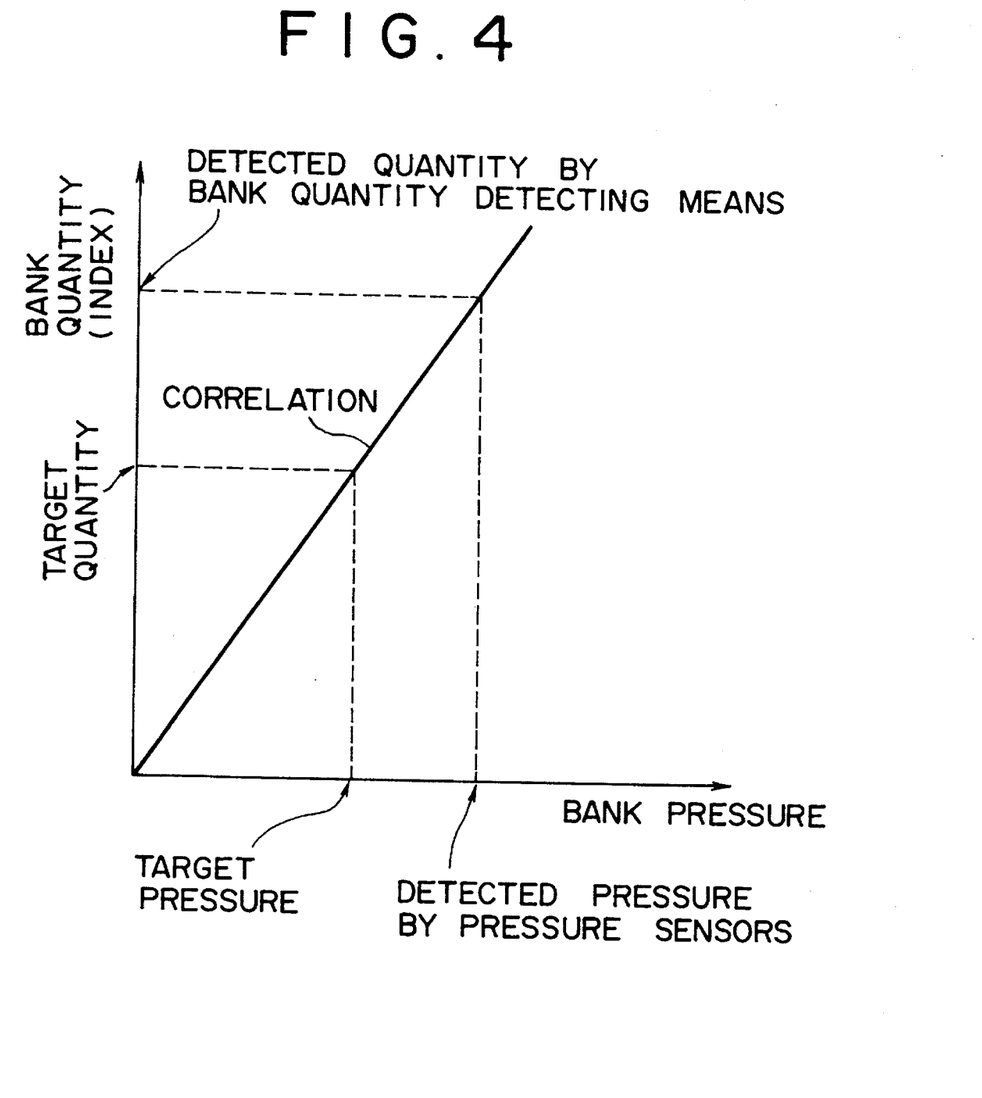
FIG. 4 is a graph showing the correlation between a bank quantity and a bank pressure.

In this preferred embodiment, the bank quantity detecting means 14 detects a single level as mentioned above. Therefore, as shown in FIG. 4, the relation between the detected bank quantity and the detected bank pressure is obtained as a single point. That is, the correlation is obtained as a straight line, i.e., as a constant of proportion between a bank quantity and a bank pressure. As shown in FIG. 4, the processing means 16 functions to convert a target value of the bank quantity into a pressure value by using the proportional constant obtained above and set this pressure value to the target pressure mentioned above.

Figure 5:
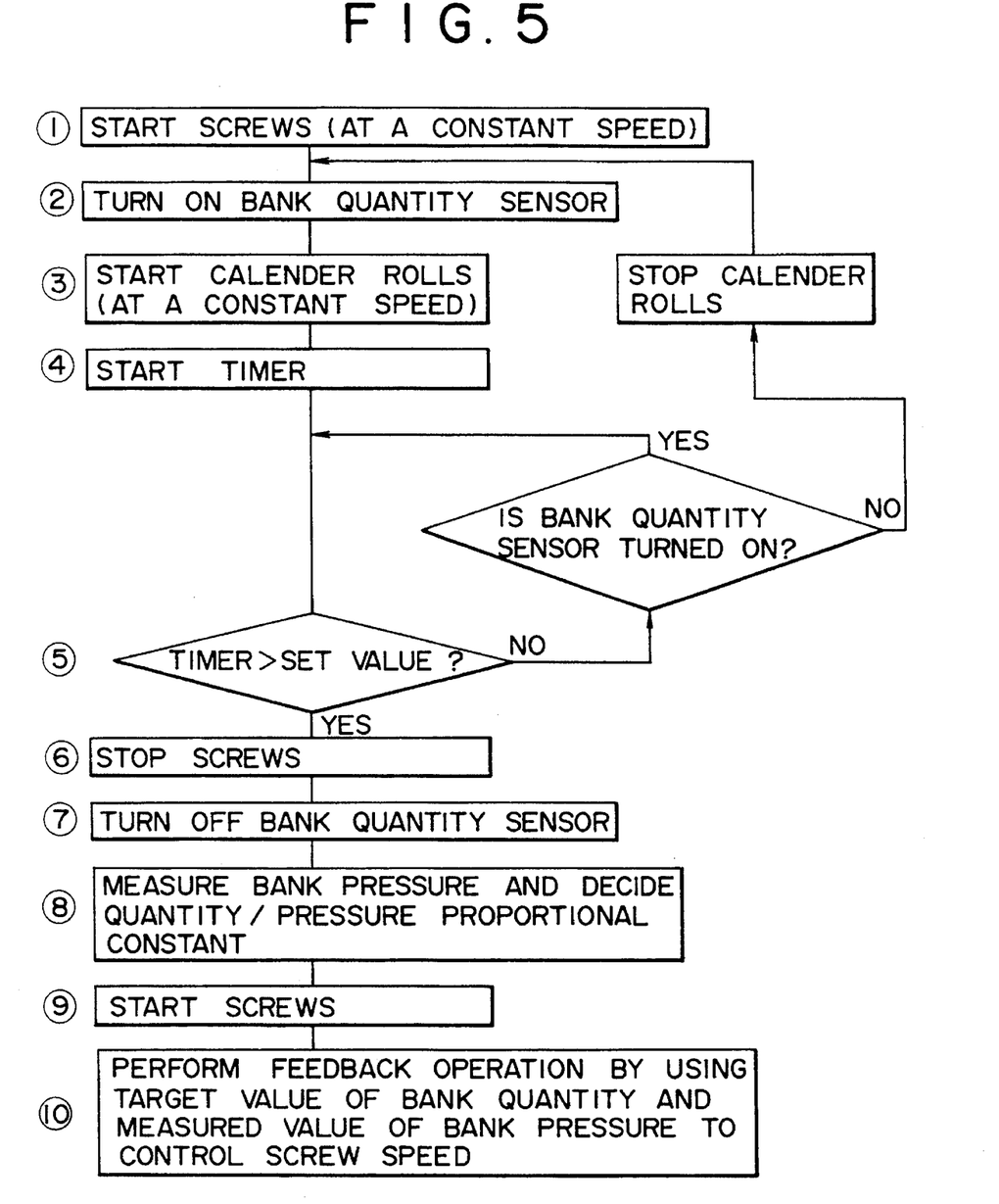
FIG. 5 is a flowchart showing the function of processing means in a control device.
Figure 6A:
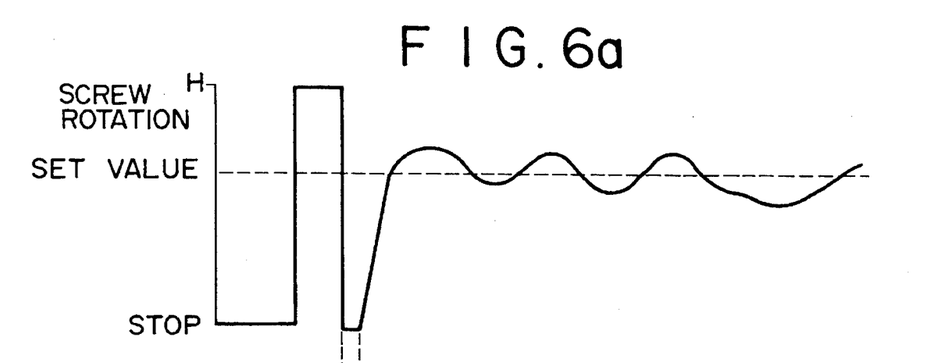
Figure 6B:
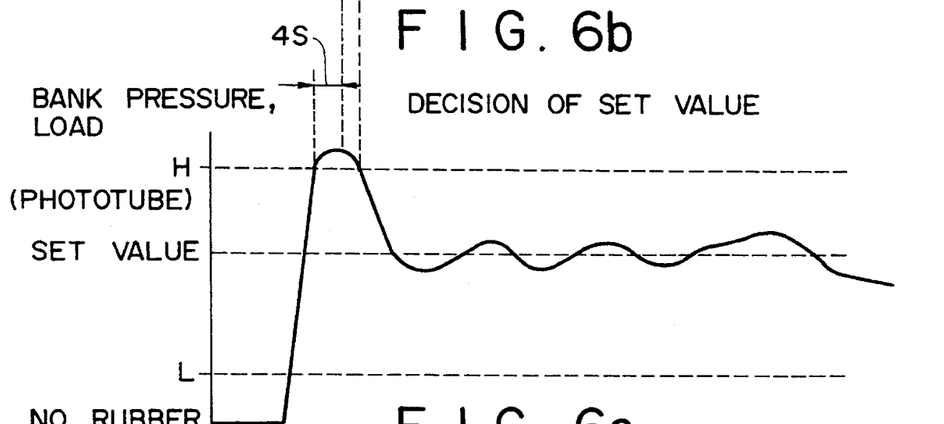
Figure 6C:
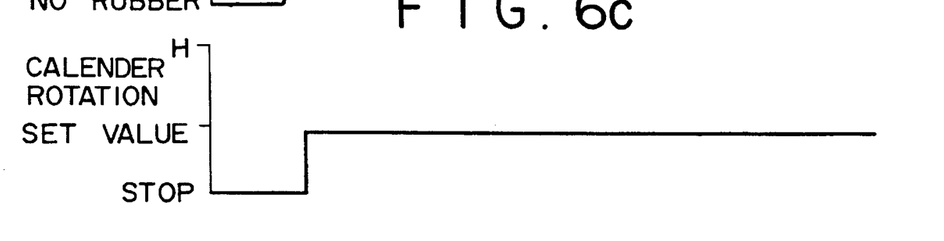

FIG. 5 shows a flowchart of processing to be performed by the processing means 16, and FIG. 6 shows a change in bank quantity with time elapsed.

Referring to FIG. 5, when the screw drive motor 5 is started to rotate the screws 3 at a constant speed, the material charged from the hopper 6 is extruded by the screws 3 from the outlet 7 into the bank portion 12 (step 1).

The material fed into the bank portion 12 gradually increases in quantity. When the level of the material reaches a predetermined detection level of the bank quantity detecting means 14, the detecting means 14 is turned on to detect the level of the material (step 2).

At this time, the calender drive motor 11 for the roller die 2 is automatically started to rotate the rollers 9 at a line speed (constant speed) (step 3).

The quantity of the material to be discharged from the outlet 7 corresponding to the initially set constant speed of the screws 3 is set greater than the quantity of the material to be extruded from the bank portion 12 corresponding to the line speed of the rollers 9. Therefore, the material fed into the bank portion 12 continues to increase over the predetermined detection level of the bank quantity detecting means 14. When the level of the material in the bank portion 12 continues to be greater than the detection level of the bank quantity detecting means 14 for a predetermined time period (about 4 to 10 seconds) (steps 4 and 5), the screws 3 are once stopped (step 6).

Figure 3A:
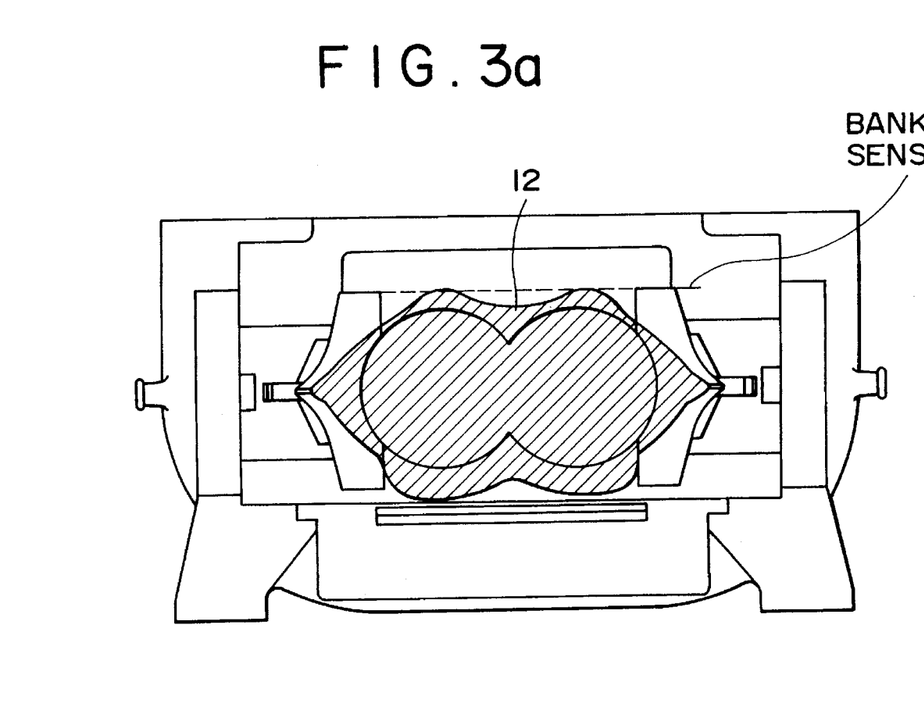
Figure 3B:
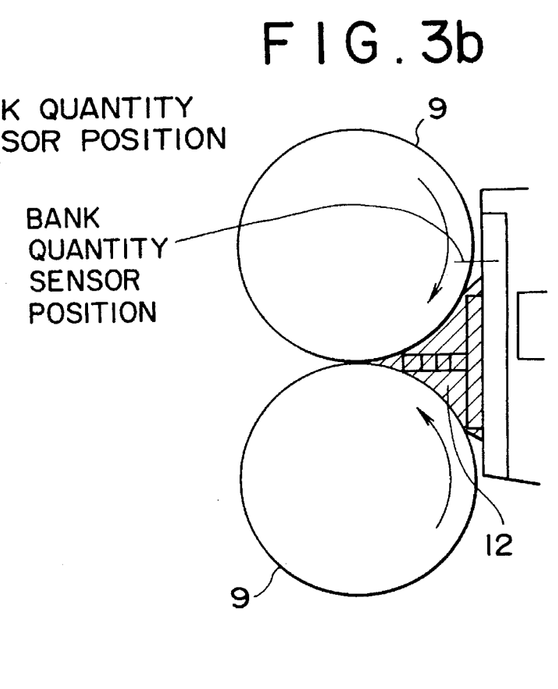

When the screws 3 are thus stopped, the bank quantity gradually decreases and the level of the material in the bank portion 12 reaches the predetermined detection level of the bank quantity detecting means 14 as shown in FIGS. 3a–b. At this time, the bank quantity detecting means 14 is turned off (step 7).

At the same time the bank quantity detecting means 14 is turned off, the bank pressure is detected by the pressure sensors 13, and the constant of proportion between the bank quantity and the bank pressure is decided as shown in FIG. 4 (step 8).

Then, the target value (which is preliminary set) of the bank quantity in the bank portion 12 is converted into a pressure value by proportional calculation with use of the above-obtained proportional constant as shown in FIG. 4. This pressure value is then set as the target pressure, and the difference between the target pressure and an actual measured value of the bank pressure is fed back to control the screw speed (steps 9 and 10).

In the above operation, the quantity to pressure conversion is carried out after the level of the material in the bank portion 12 exceeds the detection level of the bank quantity detecting means 14 and is then decreased to reach the detection level. Alternatively, the quantity to pressure conversion may be carried out when the level of the material exceeds the detection level (i.e., at the time of step 2).

Figure 2A:
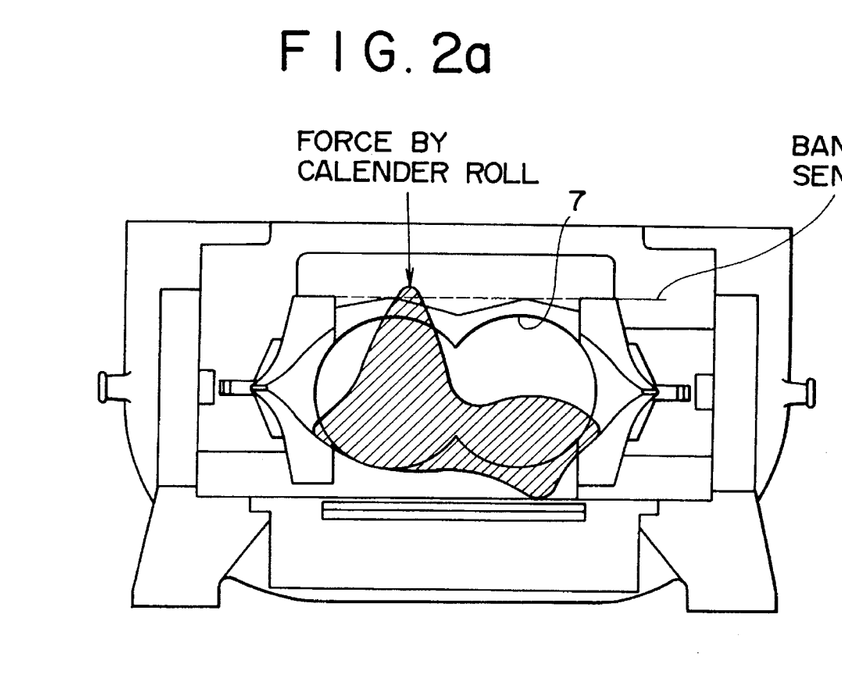
Figure 2B:
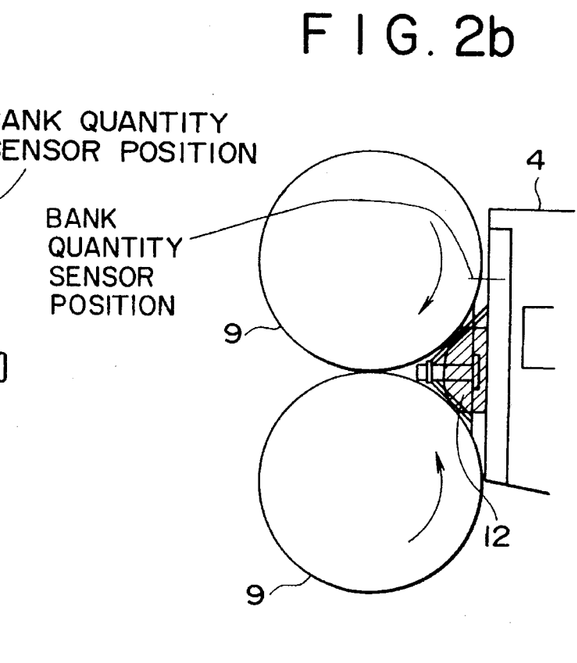

However, at the time the level of the material exceeds the detection level, the upper surface of the material present in the bank portion 12 is greatly uneven and not smooth as shown in FIGS. 2a–b. Accordingly, in terms of improvement in control accuracy, it is more preferable to carry out the quantity to pressure conversion after applying a downward force to a projecting portion of the uneven upper surface of the material to smoothen the upper surface and decrease the bank quantity by rotation of the rollers 9 as shown in FIGS. 3a–b.

Figure 7:
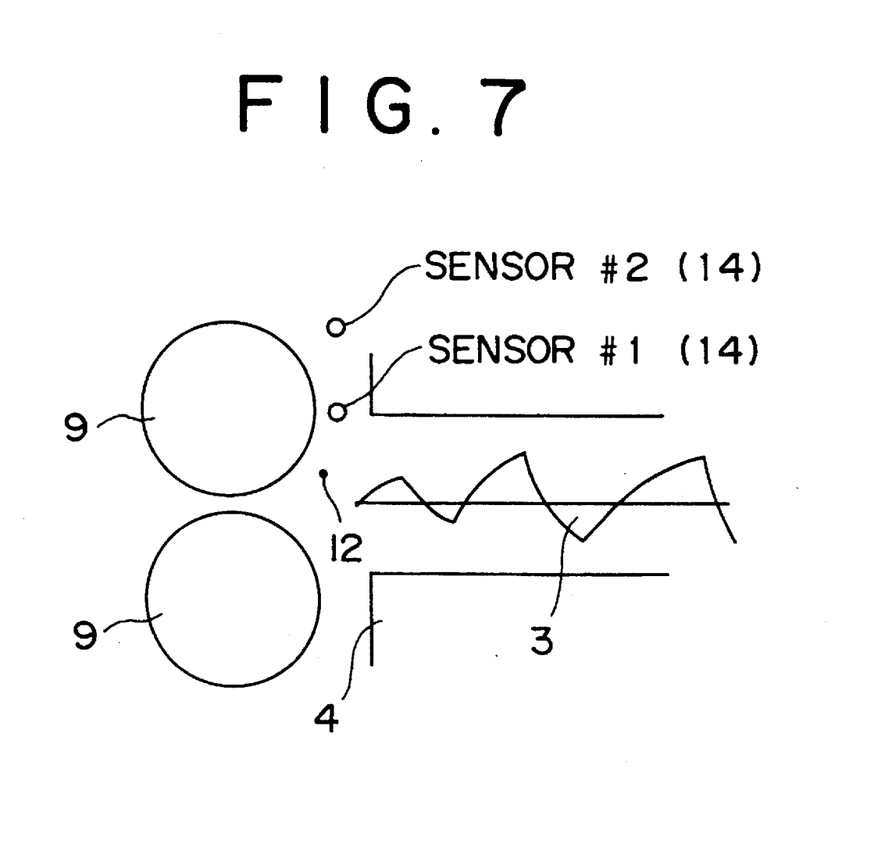
FIG. 7 is a sectional view of an essential part in a modification wherein two sensors as the bank quantity detecting means are provided.
Figure 8:
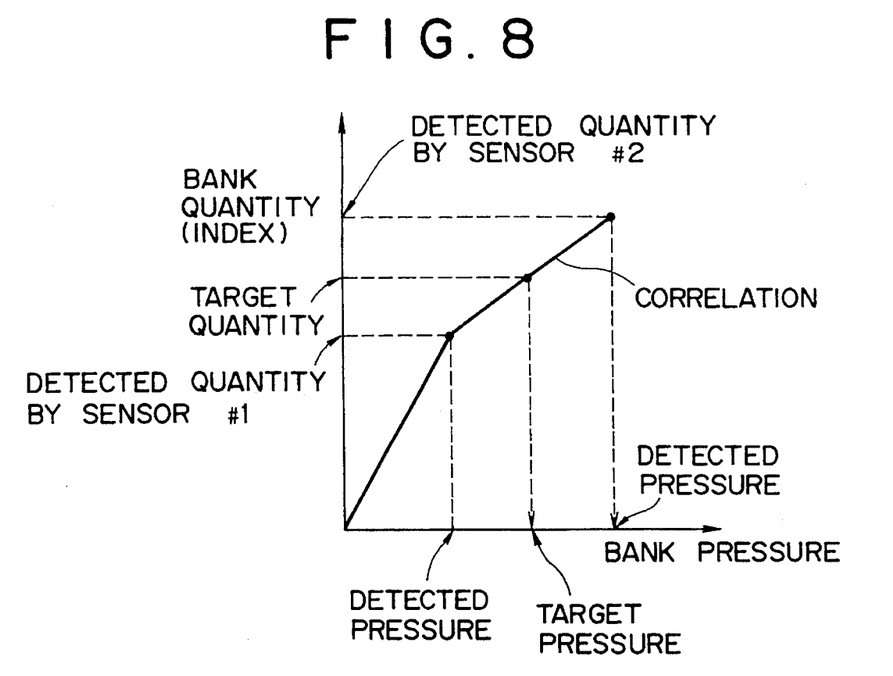
FIG. 8 is a graph showing the modification of FIG. 7, wherein the correlation between the bank quantity and the bank pressure is represented as a broken line.

FIGS. 7 and 8 show a modification of the above preferred embodiment, wherein two sensors as the bank quantity detecting means 14 are located at a lower position and an upper position in the bank portion 12.

In this case, at the time the bank quantity is detected by each bank quantity detecting means 14, the bank pressure is detected by the pressure sensors 13. Accordingly, the correlation between the bank quantity and the bank pressure can be obtained as a broken line as shown in FIG. 8.

As another modification, a plurality of levels more than the two levels may be detected by the bank quantity detecting means 14. In this case, the correlation between the bank quantity and the bank pressure can be obtained as a curve $f(x)$ as shown in FIG. 9.

Figure 9:
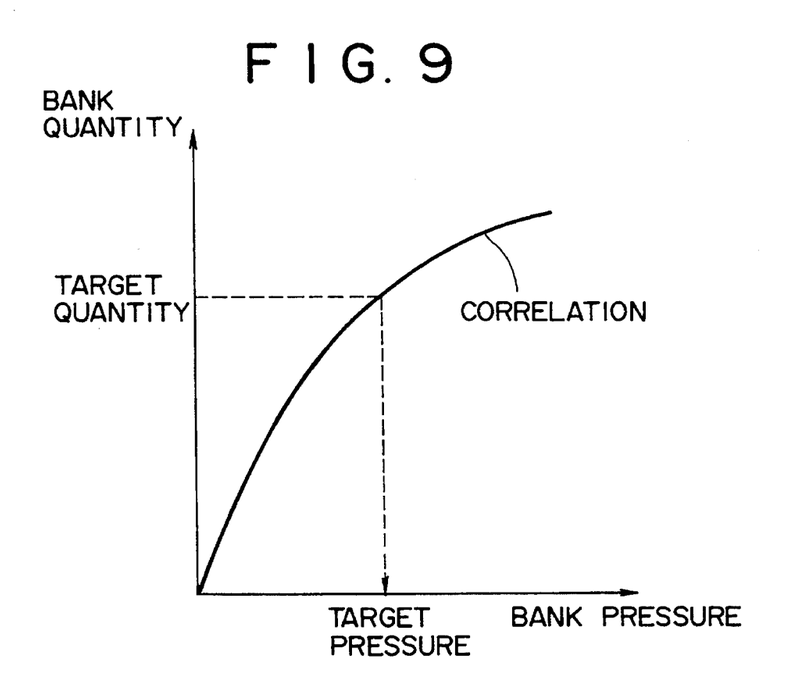
FIG. 9 is a graph showing another modification wherein the correlation between the bank quantity and the bank pressure is represented as a curved line.

In each case of FIGS. 8 and 9, the correlation is obtained as an expression of conversion from a bank quantity to a bank pressure by the processing means 16. With use of the conversion expression, the processing means 16 converts the target value of the bank quantity in the bank portion 12 into a pressure value and sets this pressure value as the target pressure mentioned above. Then, the difference between the target pressure and an actual measured value of the bank pressure is fed back to control the screw speed.

Figure 10:
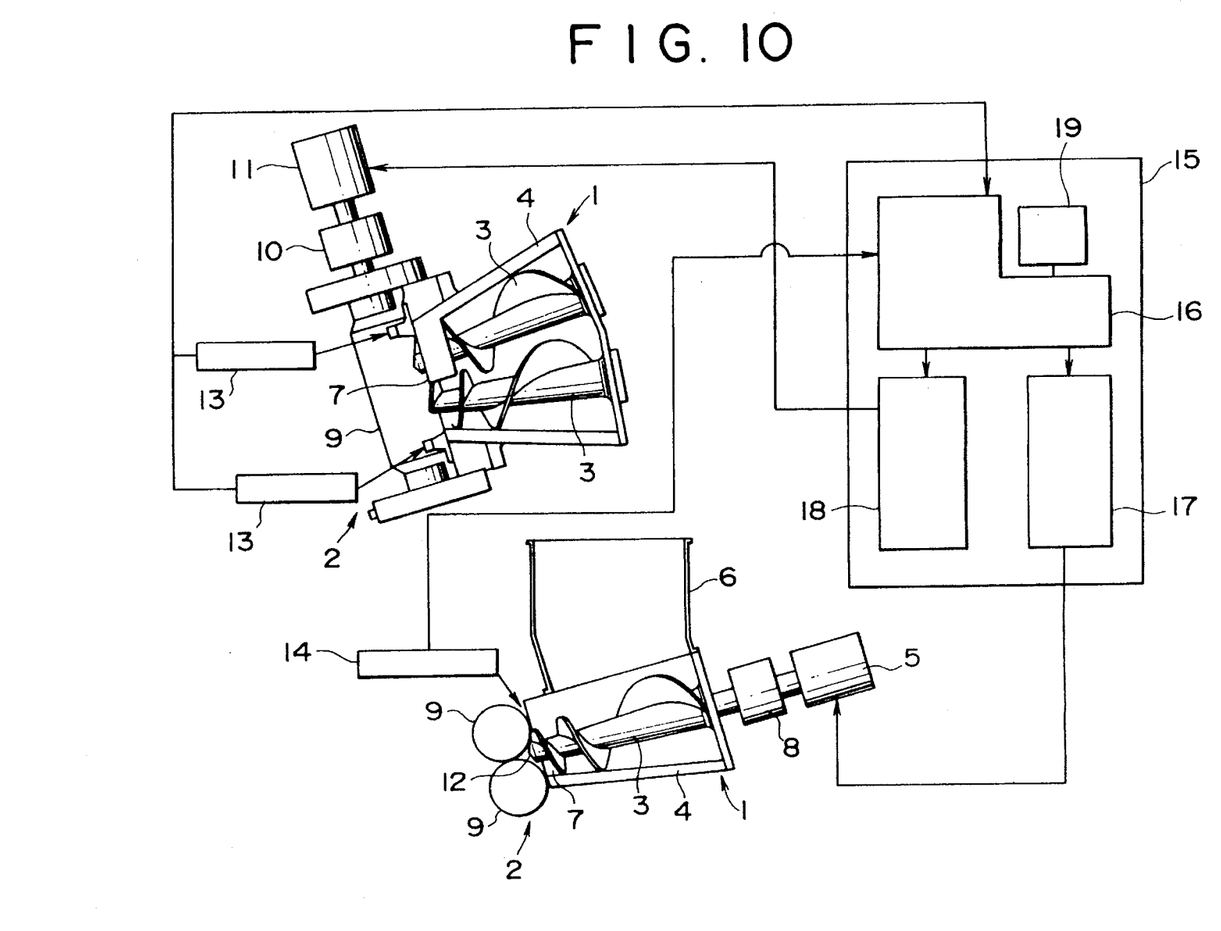
FIG. 10 is a block diagram of a bank quantity adjusting device for an extruder according to another preferred embodiment of the present invention.

FIG. 10 shows another preferred embodiment of the present invention, in which the control device 15 further includes storing means 19. In each previous embodiment, the correlation between the bank quantity and the bank pressure is obtained at the time of actual operation, whereas in this preferred embodiment the correlation between the bank quantity and the bank pressure is preliminary obtained and stored in the storing means 19.

Figure 11:
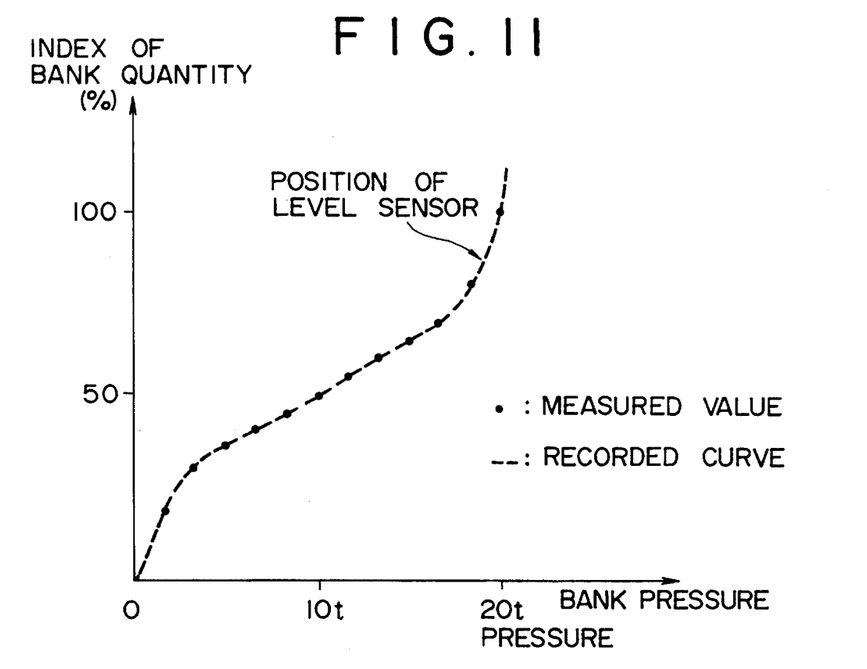
FIG. 11 is a graph showing the correlation between the bank quantity and the bank pressure, wherein the correlation is preliminary stored in storing means.

That is, a preliminary test is performed by using a rubber material having given characteristics to obtain the correlation between the bank quantity and the bank pressure as shown in FIG. 11 and store it in the storing means 19.

The processing means 16 in the control device 15 shown in FIG. 10 has the following function.

Figure 12:
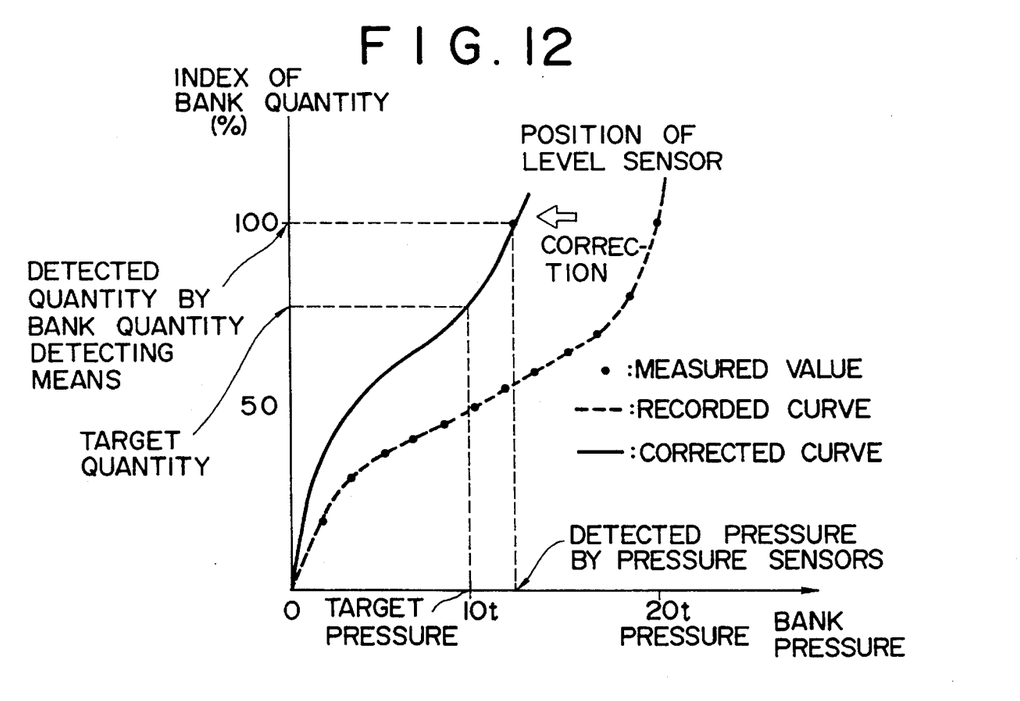
FIG. 12 is a graph illustrating that the correlation stored in the storing means is corrected.

When a predetermined bank quantity is detected by the bank quantity detecting means 14 in actual operation, a bank pressure is detected by the pressure sensors 13 to obtain the relation between the detected bank quantity and the detected bank pressure. Then, as shown in FIG. 12, the correlation stored in the storing means 19 is corrected so that the relation obtained in the actual operation satisfies the stored correlation. Then, with use of the corrected correlation, the target value of the bank quantity is converted into a pressure value, and this pressure value is set as the target pressure.

The correction of the correlation means to keep the form of a curved line representing the correlation and expand or contract the graph so that the curved line passes the intersection between the detected bank quantity and the detected bank pressure. That is, even when the hardness of the rubber changes, the distribution of the rubber in the bank portion 12 is substantially uniform, so that the same relational expression can be applied.

Figure 13:
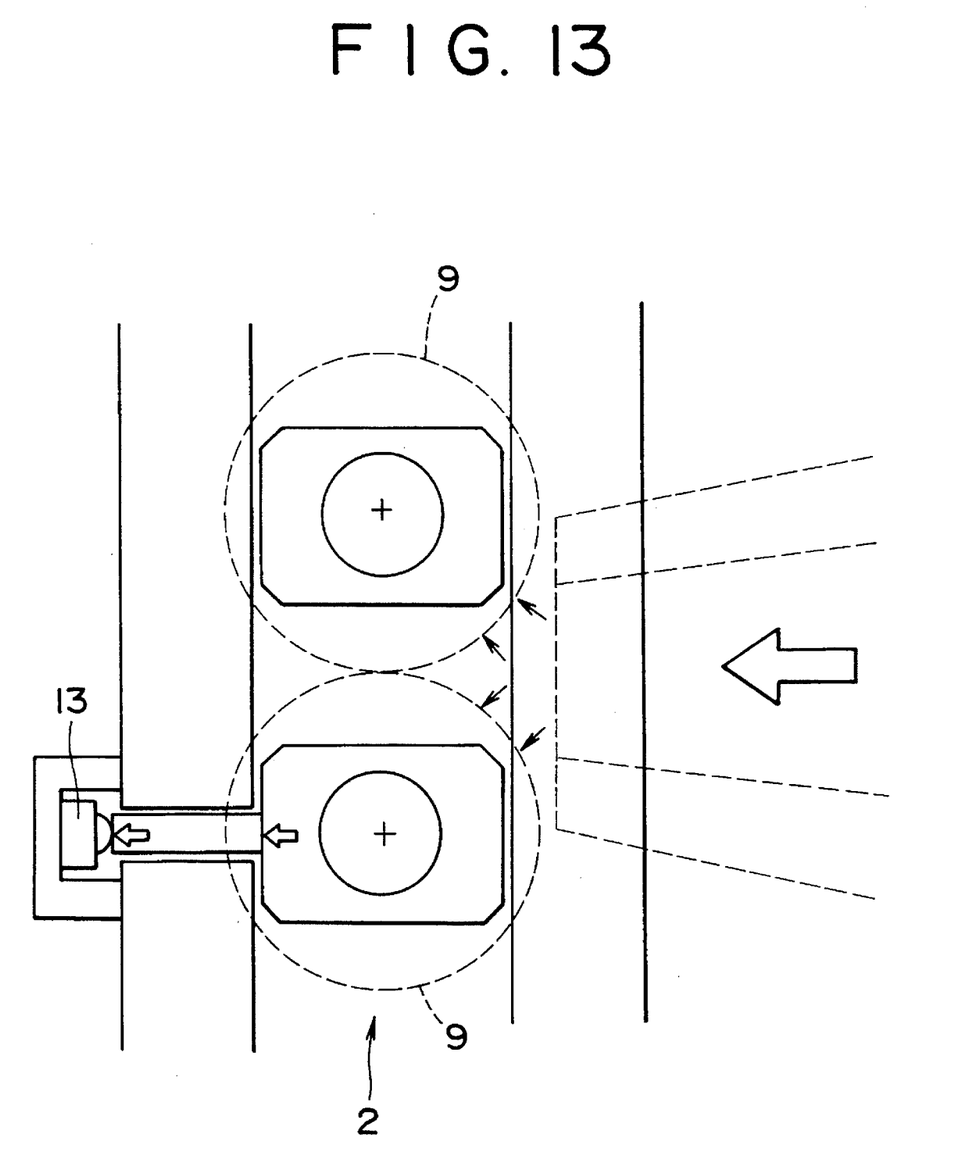
FIG. 13 is a sectional view showing another preferred embodiment relating to a pressure sensor.

It is to be noted that the present invention is not limited to the above preferred embodiments. For example, although the pressure sensors 13 for detecting the bank pressure are provided in the bank portion 12 in the above preferred embodiments, they may be constructed as a load cell provided outside the bank portion 12 so as to detect a load applied to the rollers 9 of the roller die 2, thus indirectly detecting the bank pressure as shown in FIG. 13. Further, pressure in the chamber 4 containing the extruding screws 3 may be detected to thereby indirectly detect the bank pressure. Thus, the kind and the location of the pressure sensor according to the present invention are not limited provided that it can detect the bank pressure.

Although the bank quantity detecting means 14 is constructed as a level sensor for detecting a certain level, which sensor consists of a light emitting element and a light receiving element in the above preferred embodiments, the bank quantity detecting means according to the present invention may be constructed as a sensor capable of continuously detecting the level or a contact type potentiometer as described in Japanese Patent Publication No. 57-26936.

Although the bank quantity detecting means 14 in the above preferred embodiments detects the level of the material in the bank portion as the bank quantity, the bank quantity detecting means according to the present invention may detect the volume, weight, etc. of the material as the bank quantity.

Thus, the bank quantity used in the present invention includes not only the level of the material but also the volume, weight, etc. of the material or a dimensionless index etc.

Further, although the control device 15 controls the rotational speed of the screws 3 in the above preferred embodiments, the control device according to the present invention may control the rotational speed of the rollers 9 or control both the speed of the screws 3 and the speed of the rollers 9.

This invention may be embodied in other various manners without departing from the spirit and scope of the invention. It is therefore to be appreciated that the preferred embodiments mentioned above are merely illustrative in all aspects and are not construed to be restrictive. The scope of this invention is defined by the appended claims, and various modifications and changes belonging to the equivalence to the claims are intended to be all embraced by the claims.

What is claimed is:

1. A bank quantity adjusting device for an extruder, comprising:

a chamber having an outlet;

a plurality of screws provided in said chamber for extruding a material from said outlet of said chamber;

a roller die having a pair of upper and lower rollers facing said outlet of said chamber for sheeting said material extruded by said screws;

a bank portion defined between said outlet of said chamber and said roller die for accumulating said material extruded from said outlet of said chamber;

bank pressure detecting means for detecting a bank pressure of said material in said bank portion;

bank quantity detecting means for detecting a bank quantity of said material in said bank portion;

converting means for converting a target value of said bank quantity into a pressure value by using a detection value of said bank quantity detected by said bank quantity detecting means and a detection value of said bank pressure detected by said bank pressure detecting means upon detection of said detection value of said bank quantity; and control means for controlling one or both of a rotational speed of said screws and a rotational speed of said rollers as a function of said pressure value obtained by said converting means.

2. A bank quantity adjusting device for an extruder according to claim 1, wherein said converting means obtains a correlation between said bank quantity and said bank pressure and converts said target value of said bank quantity into said pressure value by using said correlation.

3. A bank quantity adjusting device for an extruder according to claim 2, wherein said converting means obtains a constant of proportion between said bank quantity and said bank pressure representing said correlation from a single level of said material in said bank portion detected by said bank quantity detecting means and a single detection value of said bank pressure detected by said bank pressure detecting means upon detection of said single level.

4. A bank quantity adjusting device for an extruder according to claim 2, wherein said converting means obtains a broken line representing said correlation from a plurality of levels of said material in said bank portion and a plurality of detection values of said bank pressure detected by said bank pressure detecting means upon detection of said plurality of levels.

5. A bank quantity adjusting device for an extruder according to claim 2, wherein said converting means obtains a curved line representing said correlation from a plurality of levels of said material in said bank portion and a plurality of detection values of said bank pressure detected by said bank pressure detecting means upon detection of said plurality of levels.

6. A bank quantity adjusting device for an extruder according to claim 1, further comprising storing means for storing a preliminary obtained correlation between said bank quantity and said bank pressure, wherein said converting means corrects said correlation stored in said storing means so that a relation between said detection value of said bank quantity and said detection value of said bank pressure satisfies said correlation stored in said storing means, and converts said target value of said bank quantity into said pressure value by using said correlation corrected.

7. A bank quantity adjusting device for an extruder according to claim 6, wherein said converting means corrects a curved line representing said correlation stored in said storing means so that a form of said curved line is kept unchanged but is expanded or contracted so as to allow said curved line to pass an intersection between said detection value of said bank quantity and said detection value of said bank pressure.

8. A bank quantity adjusting device for an extruder according to claim 1, wherein said bank quantity detecting means detects a single level of said material in said bank portion.

9. A bank quantity adjusting device for an extruder according to claim 1, wherein said bank quantity detecting means detects a plurality of levels of said material in said bank portion.

10. A bank quantity adjusting device for an extruder according to claim 1, wherein said converting means controls said bank quantity detecting means and said bank pressure detecting means so that when a level of said material in said bank portion increases over a predetermined detection level of said bank quantity detecting means and thereafter decreases to reach said predetermined detection level, said bank pressure is detected by said bank pressure detecting means.

11. A bank quantity adjusting device for an extruder according to claim 1, wherein said converting means controls said bank quantity detecting means and said bank pressure detecting means so that when a level of said material in said bank portion exceeds a predetermined detection level of said bank quantity detecting means, said bank pressure is detected by said bank pressure detecting means.

* * * * *